United States Patent
Braganza et al.

(10) Patent No.: US 12,353,630 B1
(45) Date of Patent: Jul. 8, 2025

(54) CHOLESTERIC LIQUID CRYSTAL DISPLAY THAT PROVIDES SENSORY FEEDBACK

(71) Applicant: Buffalo Games, LLC, Buffalo, NY (US)

(72) Inventors: Clinton I. Braganza, Kent, OH (US); Hunter Morris, Kent, OH (US)

(73) Assignee: Buffalo Games, LLC, Buffalo, NY (US)

( * ) Notice: Subject to any disclaimer, the term of this patent is extended or adjusted under 35 U.S.C. 154(b) by 0 days.

(21) Appl. No.: 18/602,453

(22) Filed: Mar. 12, 2024

(51) Int. Cl.
*G06F 3/01* (2006.01)
*G02F 1/1333* (2006.01)

(52) U.S. Cl.
CPC ........ *G06F 3/016* (2013.01); *G02F 1/133305* (2013.01); *G02F 1/13338* (2013.01)

(58) Field of Classification Search
CPC . G06F 3/016; G02F 1/133305; G02F 1/13338
USPC .......................................................... 349/12
See application file for complete search history.

(56) References Cited

U.S. PATENT DOCUMENTS

| | | |
|---|---|---|
| 5,437,811 A | 8/1995 | Doane et al. |
| 5,453,863 A | 9/1995 | West et al. |
| 6,104,448 A | 8/2000 | Doane et al. |
| 8,139,039 B2 | 3/2012 | Schneider et al. |
| 9,651,813 B2 | 5/2017 | Morris et al. |
| 10,558,065 B2 | 2/2020 | Marhefka |
| 10,739,631 B2 | 8/2020 | Lightfoot et al. |
| 11,656,519 B2 | 5/2023 | Echeverri et al. |
| 11,886,061 B2 | 1/2024 | Braganza et al. |
| 2022/0365385 A1* | 11/2022 | Echeverri ......... G02F 1/133512 |

OTHER PUBLICATIONS

U.S. Appl. No. 18/232,457, filed Aug. 10, 2023.
International Search Report and Written Opinion for PCT/EP2020/071801 dated Oct. 6, 2020, 5 pages.

* cited by examiner

*Primary Examiner* — Charles S Chang
(74) *Attorney, Agent, or Firm* — Dunlap Bennett & Ludwig, PLLC

(57) ABSTRACT

A cholesteric liquid crystal display providing sensory feedback, comprises a flexible front substrate disposed near a front surface of the display, the flexible front substrate being at least partially flexible. A liquid crystal layer comprises cholesteric liquid crystal material. Pressure applied to the flexible front substrate changes reflectance of the cholesteric liquid crystal material. At least one textured surface is constructed and arranged so that pressure that is applied to the at least one textured surface provides at least one of vibratory, audible and tactile sensory feedback. At least a portion of the changes in reflectance is erased.

23 Claims, 9 Drawing Sheets

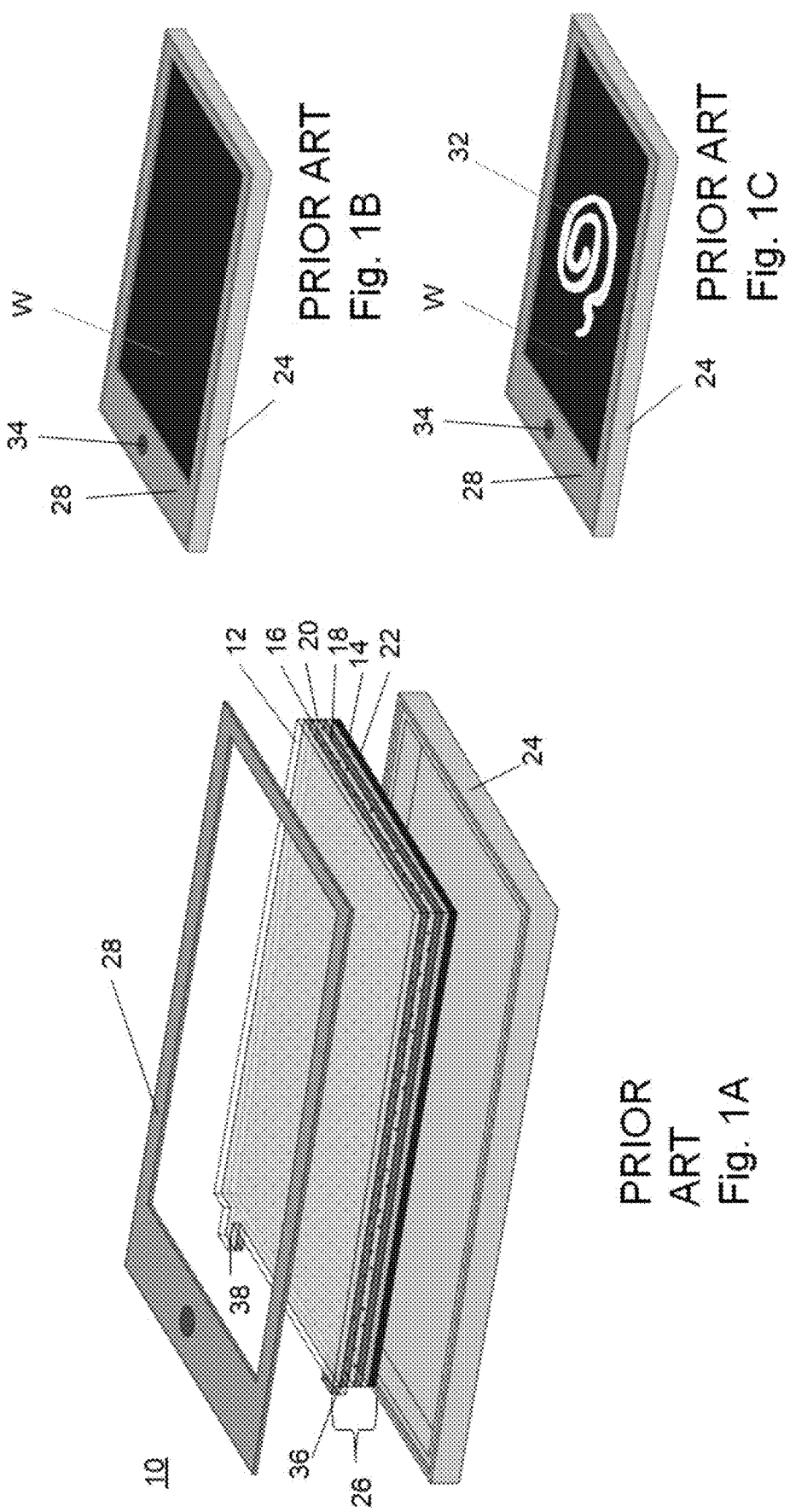

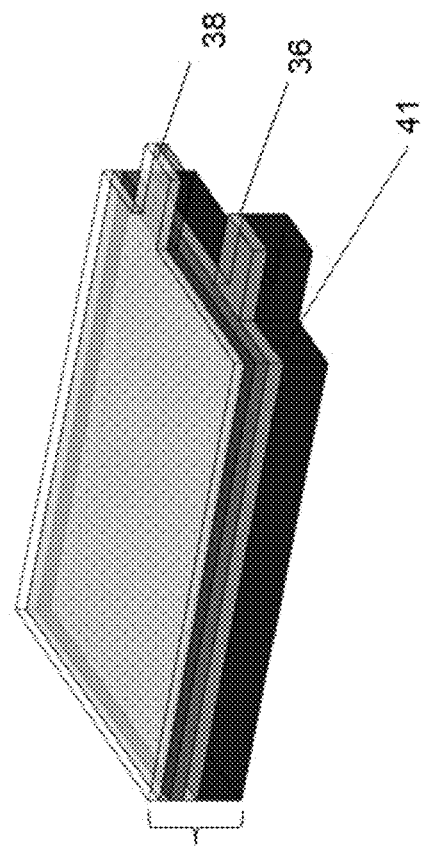
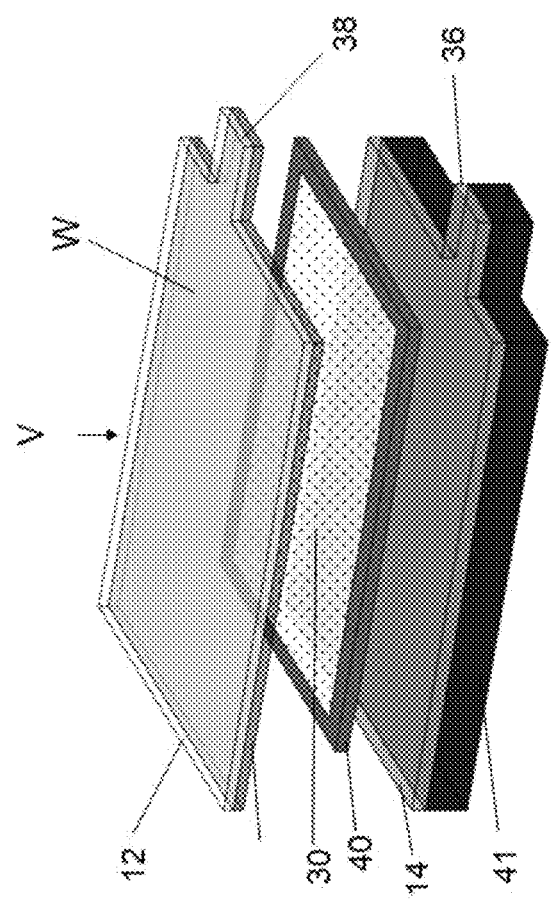
PRIOR ART
Fig. 2A
PRIOR ART
Fig. 2B

CHOLESTERIC LIQUID CRYSTAL DISPLAY THAT PROVIDES SENSORY FEEDBACK

TECHNICAL FIELD

This disclosure relates to the field of cholesteric liquid crystal displays that are written on by applying pressure to a front surface of the display.

BACKGROUND

In 2010, the Boogie Board® pressure sensitive cholesteric liquid crystal writing tablet of Kent Displays Inc. appeared on the market (see U.S. Pat. Nos. 6,104,448 and 8,139,039 incorporated by reference). It has become a popular paper replacement for household, classroom and office work offering the convenience of writing and drawing with a simple stylus, even a fingernail, and quick erase for repeated use. Over the years, numerous versions of cholesteric writing tablets, large and small, have appeared in the marketplace. The cholesteric liquid crystal writing tablets that have appeared on the market are substantially all constructed the same way in which a pressure sensitive cholesteric liquid crystal writing panel is housed within a rigid plastic casing with a bezel in front that holds it in place. The purpose of the housing is to protect the panel from damage and to accommodate the electronics and button switch needed to erase the written image and initialize the tablet for forming a new image. The housing further provides pressure support for the stylus. A liquid crystal layer is disposed between a front substrate near a front surface of the display and a back substrate that is nearer to a back surface of the display. To achieve clear writing the front substrate locally deforms upon applying pressure from a stylus or a fingernail.

The BOOGIE BOARD® writing tablet uses a unique feature of cholesteric liquid crystals, wherein the liquid crystal material is suitably sandwiched between the two substrates. The front substrate is flexible for forming the front surface or writing surface for writing and drawing. In the prior art BOOGIE BOARD® writing tablet the liquid crystal is initially in a generally transmissive texture known as the focal conic texture that allows the user to see the light absorbing background of the device provided by the back substrate or a coating or layer on the back substrate that is usually dark in color. By applying a localized pressure with a fingernail or a hard pointed stylus on the writing surface, the writing surface locally deforms, causing the focal conic texture to change to a reflective texture known as the planar texture. Normally, the stylus is moved to traverse across the viewing area of the device while applying pressure, when writing on the device, drawing pictures on the device, or the like, similar to writing with a pen on paper. The color of the planar texture is determined by the pitch length of the cholesteric liquid crystal. For example, writing on a writing tablet device having a black light absorbing background and cholesteric liquid crystal pitch length tuned to a green wavelength, creates green writing or marks contrasting with the black surroundings of the rest of the writing device where pressure has not been applied. The image is erased to form a clean page by initializing the writing device to the generally transmissive or focal conic texture. To do so, one applies voltage (see, for example, U.S. Pat. No. 10,558,065 which is incorporated by reference) to transparent electrically conductive layers on the inner surface of the substrates in response to pushing a button on the writing tablet. Both the focal conic and planar textures are stable and require no voltage to be maintained. The only voltage that is used is an erasing voltage pulse applied to the electrically conductive layers that transitions all the liquid crystal layer, including the planar texture of marks, to the focal conic texture.

Turning to more details of the construction of a Boogie Board® writing tablet 10, as illustrated in the exploded view of FIG. 1A, the front substrate 12 and back substrate 14 support the electrically conductive layers 16, 18. The front substrate 12 is transparent and flexible so that local pressure on the front substrate by a pointed stylus locally deforms the front substrate so as to alter the local texture of the cholesteric liquid crystal material 20 (cholesteric liquid crystal material dispersed in a polymer matrix) to reflect light and create an image. The back substrate 14 can be transparent but the device can include the adjacent light absorbing layer 22 that is opaque or semitransparent to create contrast for the light reflecting image. Alternatively, the back substrate 14 can be opaque or semitransparent to serve as the light absorbing layer. A rigid casing 24 houses the writing panel 26, held in place by bezel 28 as illustrated in the exploded view of FIG. 1A as well as in the front perspective view of the assembled tablet, FIG. 1B. The casing 24 and the bezel 28 are sufficiently rigid to protect the writing panel 26 and prevent substantial flexing of the back substrate 14 from occurring when used as a writing or drawing tablet. The casing 24 further supports the pressure of the stylus when writing. A liquid crystal layer 30 (FIG. 1D) includes the cholesteric liquid crystal material 20. Because of the protection provided by the combined rigid casing 24 and bezel 28 the liquid crystal layer 30 of cholesteric liquid crystal material 20 may need be only weakly or partially sealed between the electrically conductive layers 16, 18 and being protected from significant bending or flexing which can delaminate the layers and damage the writing tablet. Cholesteric liquid crystal writing and drawing tablets of the prior art are made to avoid significant bending or flexing since the writing panel 26 is protected from delamination or otherwise damage by the rigid casing 24 and the rigid bezel 28 as further illustrated in FIG. 1D.

The casing 24 is usually made of rigid polymer and can flex only slightly as the housing needs to be rugged for normal use with the casing further supplying pressure support for the stylus. When one presses on the writing surface W front substrate 12 of the writing panel 26 with a hard pointed stylus or fingernail, the front substrate 12 locally deforms causing the cholesteric liquid crystal material 20 to flow, thereby changing its optical texture from the focal conic transparent texture to the brilliant, reflective color planar texture. Where pressure is applied by a hard pointed object, an image 32 is therefore formed on the writing panel 26 as illustrated in FIG. 1C by a figure such as sketched with the pointed object. The reflective color of the image contrasts well with the opaque or semitransparent color below the liquid crystal layer. An image formed by the hard pointed stylus or fingernail will remain on the tablet indefinitely without application of a voltage until erased. Erasure can be accomplished with the writing panel being cleared by a press button switch 34 that applies voltage waveforms to transparent conducting electrodes disposed on ledges 36 and 38, respectively, on the inner surfaces of the substrate 14 and 12, that drives the cholesteric liquid crystal from its color reflective state back to its focal conic transparent state, initializing or clearing the writing panel for a new image as illustrated in FIG. 1B. The erase electronics (FIG. 1D) that supplies the voltage waveforms is housed inside the casing. The above-described principle of operation is disclosed in more detail in U.S. Pat. No. 6,104,448, with erase voltage waveforms disclosed in U.S. Pat. No. 10,558,065, which are incorporated herein by reference.

The display can include a seal 40 in a shape of a frame (e.g., PRIOR ART FIGS. 2A, 2B) around a perimeter that confines the liquid crystal layer 30 inside the perimeter. The seal 40 is located between the front substrate 12 and the back substrate 14 that are coated with the electrically conductive layers 16, 18. The seal 40 confines the sides of the liquid crystal layer 30 inside the perimeter. The seal 40 can comprise elastomeric material, adhesive material (e.g., cured adhesive) and/or welded material such as disclosed in U.S. Pat. No. 8,958,048, which is incorporated herein by reference. A seal 40 that is welded, such as may be implemented by a laser or heat, may be used in some applications; however, a seal of adhesive in particular is used since it not only completely surrounds the liquid crystal in one aspect, but also provides robust flexing of the writing tablet without damage. A seal 40 that is welded may not completely surround the liquid crystal material since welding can easily destroy the ledges of exposed electrically conductive layers. The seal 40 may comprise at least one of a weld of the front and back substrates, a bead of elastomeric material and a bead of adhesive material.

U.S. Pat. No. 10,739,631, owned by the assignee Kent Displays Inc., discloses a unique pressure support for the stylus providing enhanced line acuity. An adhesive layer with the proper adhesive properties is disposed between the lower electrically conductive layer and a backing (e.g., forming multilayer backing 41; FIGS. 2A, 2B) so that users can write or draw clear and crisp lines, maintaining sharp line acuity further reducing the visual effect of particles and in general improving aesthetic yield. The disclosed backing of a liquid crystal writing device reinforces the writing surface so that users can write or draw upon it with clear and crisp lines. The backing was not designed for permitting flexing such as bending, twisting or rolling the tablet. The pressure support disclosed in this patent is designed for writing clear, crisp lines with a rigid backing of aluminum clad plastic disclosed in the patent. A mechanical clamp structure is disclosed for securing the display in a surrounding casing.

A cholesteric liquid crystal writing device has been designed so as to enable Flex to Erase. See U.S. Pat. No. 11,656,519, owned by the assignee Kent Displays Inc., which is incorporated herein by reference in its entirety. The liquid crystal layer is adapted so that suitable mechanical flexing of the writing device will initialize the cholesteric liquid crystal material to the reflective texture as well as erase writing on the writing device, enabling it to be reused. Flexing of the writing device provides an alternative way of erasing it instead of applying voltage. Different modes of flexing can be applied to the writing device having writing on it to achieve full erasing of the image. Full erase to the reflective texture employs flexural stress traveling across the flexible writing device.

U.S. Pat. No. 11,886,061 owned by the assignee Kent Displays Inc. for a Resilient Display, discloses a writing device including cholesteric liquid crystal material that is resilient to bending, including twist bending, enabling the writing device to be bent to a radius of curvature of 100.0 millimeters for 10 repetitions of the bending and after each of the repetitions of the bending a voltage waveform completely erases the image, initializing the writing device. It can include a back support layer in back of the liquid crystal layer.

SUMMARY OF THE DISCLOSURE

A sensory cholesteric liquid crystal display of the disclosure provides vibratory, audible and/or tactile sensory feedback to a user writing or marking on the cholesteric liquid crystal display, for example, using a moving stylus, fingertip, fingernail, roller or stamp.

In the prior art cholesteric liquid crystal writing device, such as the Boogie Board® writing tablet, to improve writing on the flexible writing panel, the bottom substrate is attached to a rigid and smooth case made of various materials including ABS, Acrylic, or polystyrene. In some cases, such as in the VersaNotes® writing tablet, a flexible backer is used. When a small erase voltage waveform is applied to the liquid crystal layer in these writing tablets, it is set to an initial transmissive texture that is not reflective. Writing pressure on the film closest to the user locally deforms the film, causing the liquid crystal to flow and reorient to a bright reflective state showing the mark. In all these instances the writing experience is one of pen on paper. The fingernail or stylus, for example, smoothly glides on the writing surface of the writing tablet.

The sensory cholesteric liquid crystal display of this disclosure is designed to provide at least one of vibratory, audible and tactile sensory feedback. By providing at least one textured surface to the case on the side closest to the bottom substrate (sensory layer) in a particular construction and arrangement, one is able to feel and see this texture when marking the front substrate with a stylus, fingernail, or fingertip. Depending on the hardness of the marking instrument and the textured surface's surface roughness and/or pattern, one can also hear a sound. Alternatively, one can add a textured surface (sensory layer) between the bottom substrate and the back case. The sensory layer could be a film, cardstock, or loose particles. The film or cardstock could be patterned with perforations, a texture protruding out of the surface, and/or embossing pattern. The pattern can be made of a multitude of materials with different hardness/softness, textures, color, and/or shape, size to allow for a different feel and sound as one moves the marking instrument across the surface. The combination of this sensory layer and the marks made after applying pressure create a sensory display. This sensory experience is completely electronic-less, unlike others based on piezo actuators or motors and it also allows for the writing surface to deform to the sensory layer without any damage to the display.

The sensory layer can be also be moved on or near the front substrate, for example, in front of it. Here the sensory layer is, in a particular example, clear or semitransparent so that the markings from the liquid crystal layer are visible through it. The sensory layer can include at least one clear polymer sticker, coating, or film with embossing or height features that allow for the stylus or fingertip to feel the pattern, or to hear the stylus, while marking. If desired, the coating or film can be patterned so that only some of the marking can be shown.

In a general aspect of the disclosure, a cholesteric liquid crystal display providing sensory feedback, includes the following features. There is a flexible front substrate which is at least partially flexible. A liquid crystal layer includes cholesteric liquid crystal material. Pressure applied to the flexible front substrate changes reflectance of the cholesteric liquid crystal material. At least one textured surface is constructed and arranged so that pressure that is applied to the at least one textured surface provides at least one of vibratory, audible and tactile sensory feedback. At least a portion of the changes in reflectance is erased.

Turning now to more specific features of the cholesteric liquid crystal display of the disclosure that can be used with the general aspect and/or with other specific features of the disclosure in any combination, provided is a moving marking instrument (e.g., at least one of a moving stylus, fingertip, fingernail, roller and stamp) by which the pressure is applied.

Another feature includes electrically conductive layers between which the liquid crystal layer is disposed and erase electronics that applies a voltage waveform.

A further feature includes a back substrate in back of the liquid crystal layer.

Another feature includes a back substrate in back of the liquid crystal layer, wherein the electrically conductive layers and the liquid crystal layer are disposed between the flexible front substrate and the back substrate.

Yet another feature includes flexing of the cholesteric liquid crystal display that erases at least a portion of the changes in reflectance.

Further, a feature is that the at least one textured surface includes a plurality of elements that are: spaced apart from each other, at least one of protruding and recessed from an adjacent surface and are located near the front substrate of the cholesteric liquid crystal display. Another feature of the previous feature or the general aspect, includes a layer adapted to provide at least one of a gel sensation and a spongy sensation. A feature of the first feature of this paragraph is wherein the plurality of elements are comprised of transparent polymer and are inflexible.

Still further, featured is wherein the at least one textured surface comprises a plurality of elements that are: spaced apart from each other, at least one of protruding and recessed from an adjacent surface and are located near a back surface of the cholesteric liquid crystal display below the liquid crystal layer. More specifically, is the feature of the previous feature or the general aspect including a layer adapted to provide at least one of a gel sensation and a spongy sensation. Yet another feature of the first feature of this paragraph is that the plurality of elements are comprised of polymer and are inflexible. Another feature of the first feature of this paragraph is wherein the plurality of elements are formed as a plurality of openings in a layer of polymer or cardboard. Specifically, another feature of the first feature of this paragraph is wherein the plurality of elements are raised on a layer of polymer or cardboard.

A feature is that the at least one textured surface has a texture that is selected from at least one of diamond, rock and sand.

A feature is that the pressure that is applied to the at least one textured surface provides optical sensory feedback, whereby the pressure applied to the at least one textured surface in conjunction with the rest of the sensory display, contributes to the change in reflectance.

Another feature is wherein the pressure that is applied to the at least one textured surface with a moving marking instrument provides the tactile sensory feedback, whereby when the moving marking instrument moves over the at least one textured surface this is felt by the user.

Further is the feature wherein the pressure that is applied to the at least one textured surface by a moving marking instrument provides the vibratory sensory feedback, whereby when the moving marking instrument moves over the at least one textured surface vibrations are felt by the user.

Another feature is wherein the pressure that is applied to said at least one textured surface by a moving marking instrument provides the audible sensory feedback, whereby the moving marking instrument makes a sound when traveling over the at least one textured surface.

Further is the feature wherein the at least one textured surface comprises strips or regions formed by at least two or more textured surfaces having different textures than each other.

A feature is wherein a texture of the at least one textured surface is adapted to calm the user of the cholesteric liquid crystal display when touching with the fingertip of the user.

In another feature the back substrate is semitransparent or opaque.

A feature is a toy comprising the cholesteric liquid crystal display.

It should be understood that the above Summary of the Disclosure in some cases describes embodiments of the disclosure in broad terms while the following Detailed Description describes embodiments of the disclosure more narrowly and presents specific embodiments that should not be construed as necessary limitations of the invention as broadly defined in the claims. Many additional features, advantages and a fuller understanding of the disclosure will be had from the accompanying drawings and the Detailed Description that follows.

BRIEF DESCRIPTION OF THE DRAWINGS

FIGS. 1A-1C are an exploded perspective view and two front perspective views, respectively, of a PRIOR ART BOOGIE BOARD® liquid crystal writing tablet;

FIGS. 2A and 2B are an exploded front perspective view and an assembled front perspective view, respectively, of a PRIOR ART liquid crystal writing device having a partially rigid back structure designed for improved line acuity;

The drawings are not drawn to scale.

DETAILED DESCRIPTION

Figure 1D:
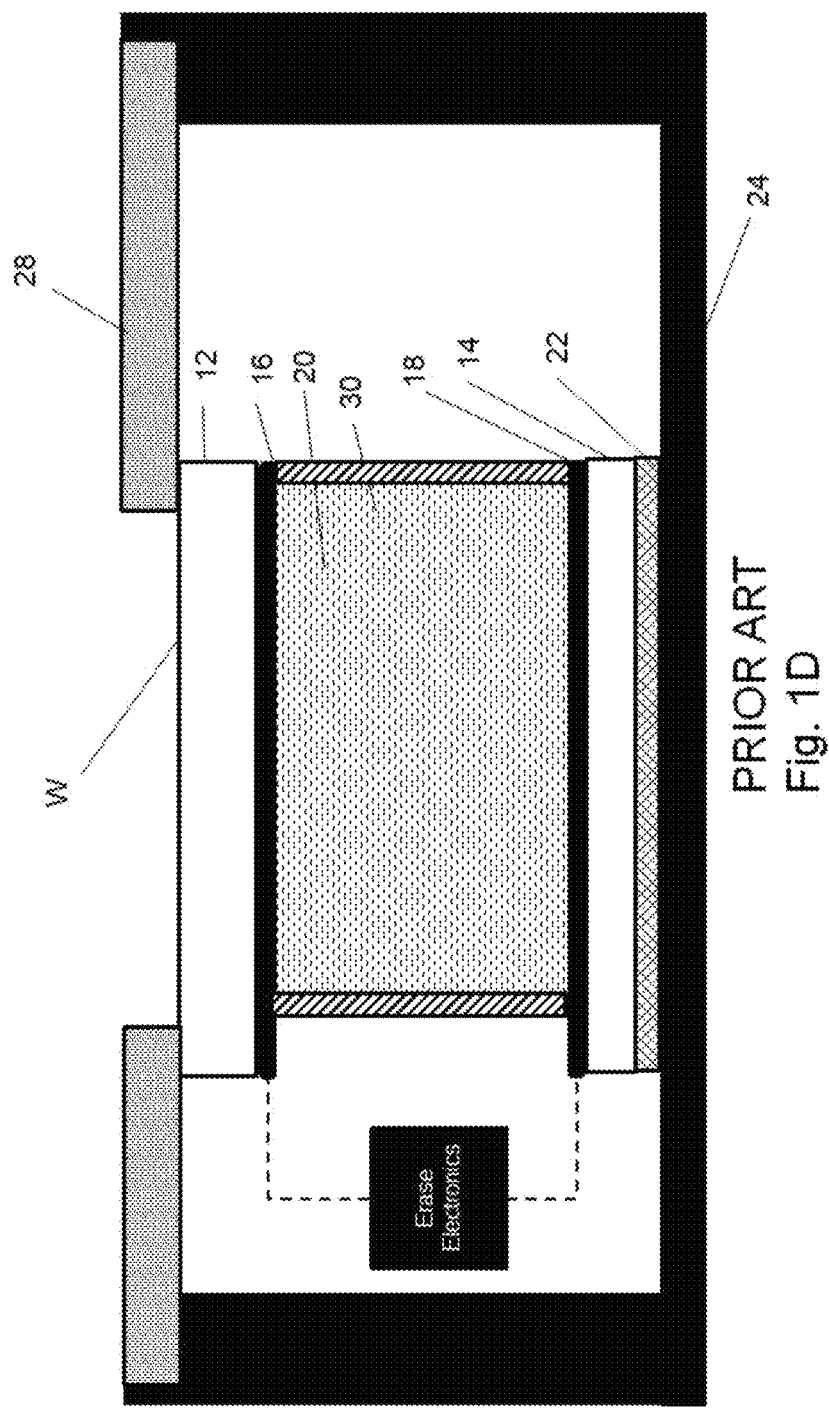
FIG. 1D is a side view of the PRIOR ART writing tablet shown in of FIGS. 1A-1C.
Figure 3:
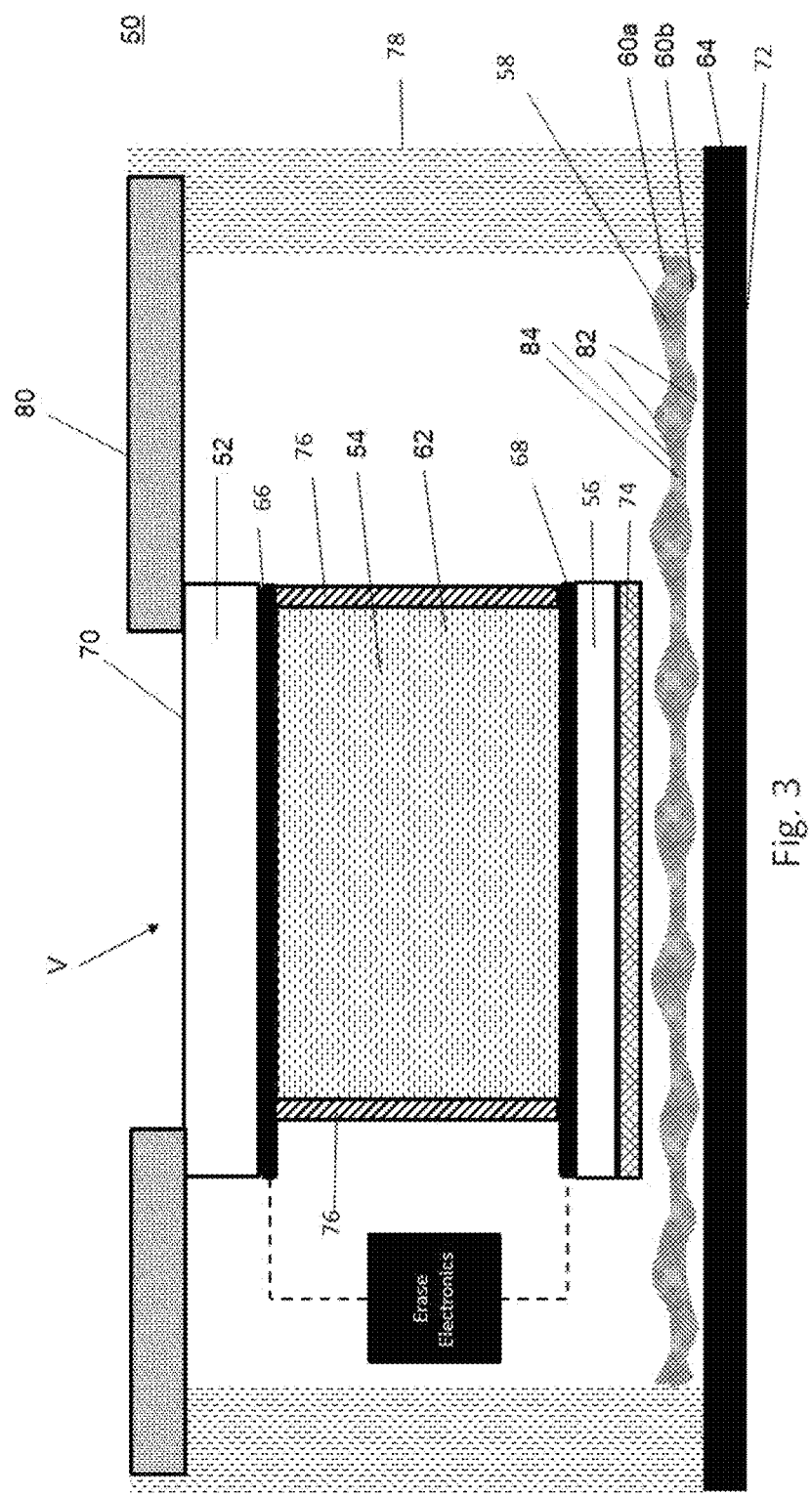
FIG. 3 is a side view of a sensory display of the disclosure in which at least one textured surface is located in back of the liquid crystal layer.

Turning now to various embodiments of this disclosure where like reference numerals represent like parts throughout the several views of the drawings, referring to FIG. 3 a cholesteric liquid crystal display 50 comprises a flexible front substrate 52 and a liquid crystal layer 54. Also included in the liquid crystal display are a flexible back substrate 56 and a sensory layer 58. The sensory layer 58 has at least one textured surface 60a, 60b that are constructed and arranged to provide at least one of vibratory, audible and tactile sensory feedback. One of textured surfaces 60a, 60b, or both of textured surfaces 60a, 60b can comprise the sensory layer 58. The pressure from the moving marking instrument (e.g., writing) on the flexible front substrate 52 and from the sensory layer 58 apply pressure to the flexible back substrate 56 that deform and induce flow in the liquid crystal layer 54 that results in an optical response/feedback. Although the sensory layer 58 is shown having a random surface texture it could be at least partially patterned. By providing the at least one textured surface 60a, 60b in back of the liquid crystal layer 54 in a particular construction and arrangement, one is able to feel and/or hear sounds from the marking instrument contacting the at least one textured surface 60a, 60b when moving the marking instrument along the flexible front substrate. In all embodiments of the disclosure, the marking instrument can be a moving stylus, fingertip, fingernail, roller or stamp. Other marking instruments can be used besides those described herein, within all embodiments of this disclosure, for example, brushes or blunt instruments. The liquid crystal layer 54 comprises cholesteric liquid crystal material 62, which optionally includes cholesteric liquid crystal dispersed in polymer. The flexible front substrate 52 is located more proximal to a user or a person V viewing the cholesteric liquid crystal display 50 than is the liquid crystal layer 54. The arrow from the user or viewer V represents a general direction in which they are looking at the cholesteric liquid crystal display 50. In this embodiment, the sensory layer 58 is located in back of the liquid crystal layer 54. The sensory layer 58 can be: a separate layer (attached to a back casing 64, and/or the flexible back substrate 56 or attached to neither); part of the back casing 64; or part of the flexible back substrate 56. Pressure applied on the flexible front substrate 52 from a marking instrument changes a reflectance of the cholesteric liquid crystal. This change in reflectance can form an image.

The flexible front substrate 52 and the flexible back substrate 56 are spaced apart from each other. An optional front electrically conductive layer 66 and an optional back electrically conductive layer 68 can be used and are spaced apart from each other. The liquid crystal layer 54 is disposed between the optional front and back electrically conductive layers 66, 68. The optional front electrically conductive layer 66 is disposed between the flexible front substrate 52 and the liquid crystal layer 54. The optional back electrically conductive layer 68 is disposed between the liquid crystal layer 54 and the flexible back substrate 56.

A front surface 70 of the cholesteric liquid crystal display 50 is located near the flexible front substrate 52, for example, the outermost surface disposed or formed on the flexible front substrate 52. The front surface 70 is, in particular, located on the flexible front substrate 52. In all embodiments of the disclosure, examples of layers that can be formed on the flexible front substrate 52 are: an anti-glare coating, a scratch resistant coating, a wear-resistant coating, and a graphic print or graphics coating. A back surface 72 of the cholesteric liquid crystal display 50 is farthest back in the cholesteric liquid crystal display 50.

The optional back casing 64 is rigid or flexible and is located near or forms the back surface 72 of the cholesteric liquid crystal display. In all embodiments of this disclosure the flexible front substrate 52 and/or the flexible back substrate 56, independently can be only partially flexible. In all embodiments of this disclosure an optional light absorbing layer 74 absorbs light passing through the liquid crystal layer 54 and is disposed in back of the liquid crystal layer relative to a direction of the person V viewing the liquid crystal display. In all embodiments of the disclosure, even if not seen in the drawings, the cholesteric liquid crystal display may include an optional seal 76 in a shape of a frame around a perimeter that confines the cholesteric liquid crystal material 62 inside the perimeter.

An optional side casing 78 is disposed along sides of the cholesteric liquid crystal display and an optional front bezel 80 presses against a perimeter of the flexible front substrate 52. The back casing 64, side casing 78, and bezel 80 can be one or separate pieces. The sensory layer 58 and the optional back casing 64 are located near the back surface 72 of the cholesteric liquid crystal display. For example, the back surface 72 is an outermost surface disposed or formed on the sensory layer 58 or the optional back casing 64. In the example shown in FIG. 3, the optional back casing 64 is located more proximal to the back surface 72 than is the sensory layer 58. The pressure applied on the flexible front substrate 52 by the marking instrument causes local deformation of the flexible front substrate 52, the liquid crystal layer 54, the flexible back substrate 56, optionally the sensory layer 58 if flexible and optionally the back casing 64 if flexible. The optional front and back electrically conductive layers 66, 68 and the optional light absorbing layer 74 also locally deform in response to the pressure. The local deformation of a flexible sensory layer 58 pushes against the flexible back substrate 56, the optional back casing 64 and against the liquid crystal layer 54. The local deformation of the components of the liquid crystal display, in particular pressure on the liquid crystal layer, changes a reflectance of the cholesteric liquid crystal material. The erase electronics can be used to apply the voltage waveform that changes the reflectance of the cholesteric liquid crystal material to the initial liquid crystal state, thereby erasing at least a portion of the changes in reflectance (e.g., erasing at least a portion of an image) as well as initializing the liquid crystal display for making the next marking. The cholesteric liquid crystal display 50 can be flexed to erase at least a portion of the changes in reflectance (e.g., at least a portion of an image) as well as initializing the cholesteric liquid crystal display for making the next image.

In particular, elements 82 (e.g., peaks) of the sensory layer 58 can be rigid and comprised of polymer, while surroundings 84 of the elements of the sensory layer 58 (e.g., recesses or valleys), can be flexible or soft, for example. On the other hand, the entire surface texture of the peaks and valleys can be made of the same material (e.g., a rigid material). The textured surface 60a is inverted from its orientation in the form of textured surface 60b (FIG. 3). The sensory layer 60 can be part of the back casing 64 or back substrate 56.

Figure 4:
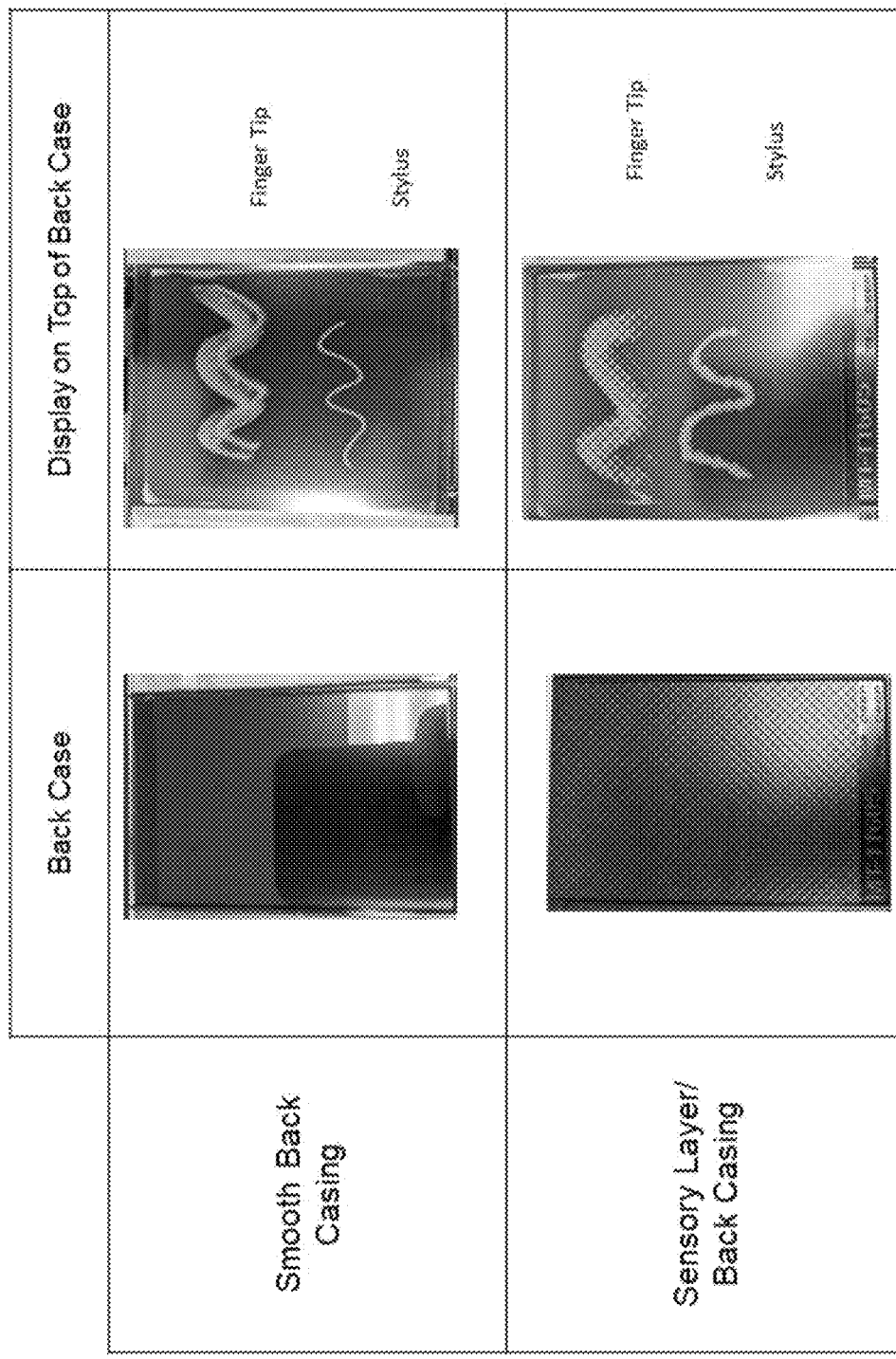
FIG. 4 shows views of a conventional display compared to a sensory display made according to FIG. 3 in which the effects of the at least one textured surface on the appearance of the marks can be seen.

FIG. 4 shows the appearance of a typical BOOGIE BOARD® writing device having a smooth back casing compared to the appearance of a cholesteric liquid crystal display of this disclosure, in particular, made according to the description above in connection with FIG. 3, but having patterned raised, rigid polymer elements formed on or applied to the back casing as the sensory layer. The left column images show what the back casing looks like without the display panel in front of it. The right column images show the assembled cholesteric liquid crystal display including the display panel overlaying the respective back panel, which have marks applied to them by applying pressure with a fingertip and a stylus. As can be seen, the marks made on the conventional display that includes a smooth back casing (right column, upper image) do not show any effects outside of the pressure applied by the fingertip and stylus. In contrast, there is a dramatic difference in the display of this disclosure in which the marks show the effect of the sensory layer's raised elements on the marks (right column, lower image). When pressure is applied the pattern of the elements or portions of the pattern of the elements, are visible inside the marks. The spaced apart elements of the sensory layer are also felt as vibrations by the fingertip and stylus, and make a sound that is heard when using the stylus. They also provide the tactile effect of being felt by the fingertip of the user. The sensory layer can produce a calming effect on the user when fingertips repeatedly move or slide over it.

Figure 5:
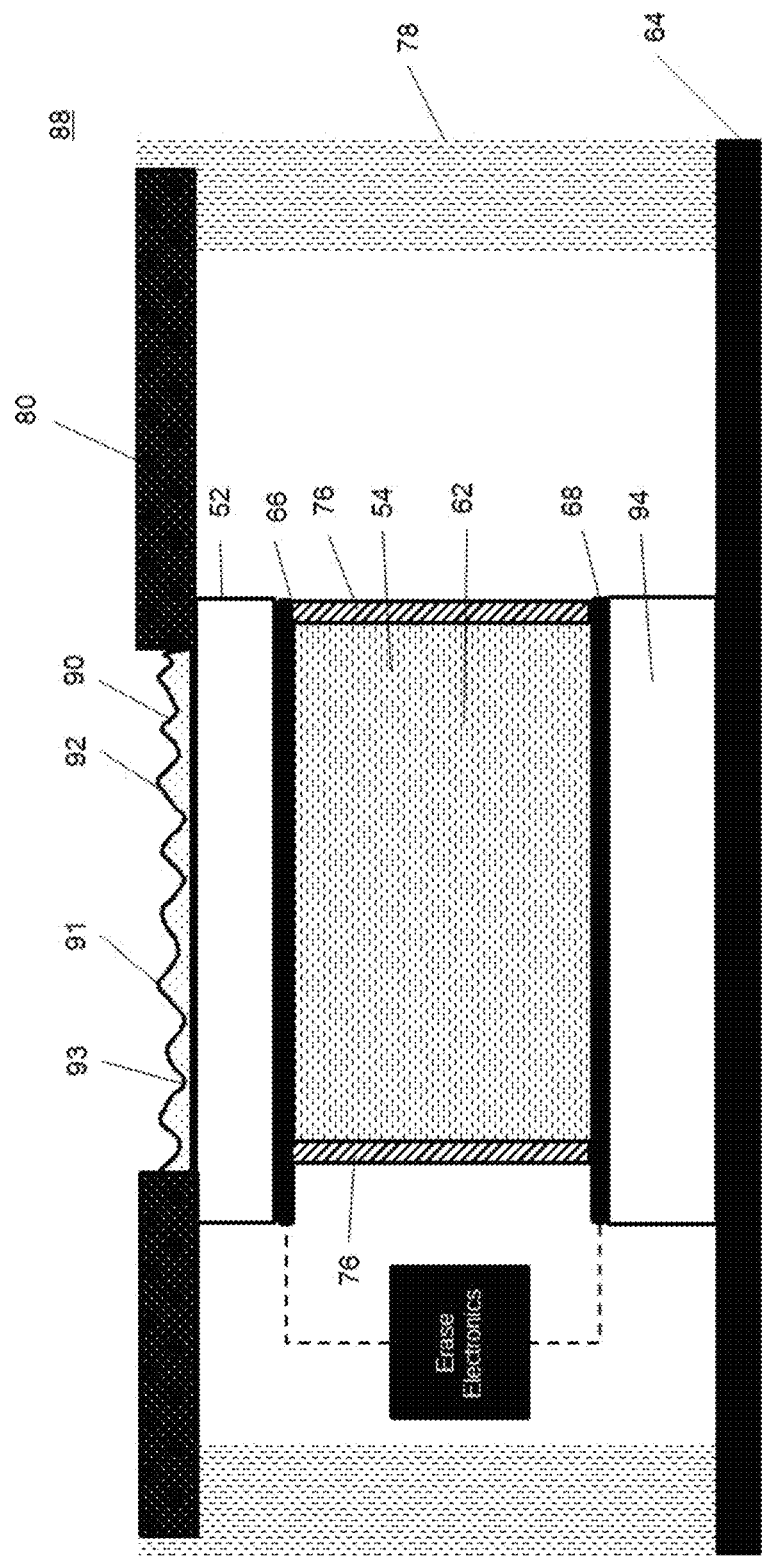
FIG. 5 is a side view of a sensory display of the disclosure in which at least one textured surface is located in front of the liquid crystal layer.

FIG. 5 shows a cholesteric liquid crystal display that is similar to that of FIG. 3, except that the sensory layer 90 is in front of or near the flexible front substrate 52 rather than in back of the liquid crystal layer 54. The sensory layer 90 has at least one textured surface 92 that is constructed and arranged to provide at least one of vibratory, audible and tactile sensory feedback. The sensory layer 90 includes peaks 91 and valleys 93 formed of at least one material that allows for flexing of the sensory layer 90. The sensory layer 90 could instead include an inverted textured surface like 60b or used in combination with an inverted textured surface like 60b. The sensory layer 90 in conjunction with the rest of the display 88 also provides optical feedback. By providing the at least one textured surface 92 in front of the liquid crystal layer 54, one is able to see, feel and hear sounds made when applying pressure on the at least one textured surface with a marking instrument. One sees the marks made on the liquid crystal layer 54 through the at least one textured surface 90 which is clear or semitransparent. The back substrate 94 of the cholesteric liquid crystal display of FIG. 5 need not be flexible and can be rigid. Moreover, in some cases this design of a cholesteric liquid crystal display 88 differs from that of FIG. 3 having a dark light absorbing layer in that the at least one textured surface 92 can be seen even without making marks. The sensory layer of FIG. 3 can however, be seen in some circumstances as when no light absorbing layer is used. The cholesteric liquid crystal display 88 is in an inactive state when it includes no marks and is in an active state when there are marks, portions of marks or a mark is in the process of being made. The sensory layer 90 need not be covered by the liquid crystal layer or any layer or substrate in this embodiment. Of course, this does not prevent other layers from being applied to the sensory layer, e.g., anti-glare coating, anti-scratch coating or wear-resistant coating. This can add to the appearance of the display, for example, enhancing its appearance with the design or pattern of the sensory layer, its texture, color and the like. In all embodiments, the sensory layer (e.g., sensory layer 90) can be in contact with a flexible substrate in an inactive state but need not be.

Figure 6:
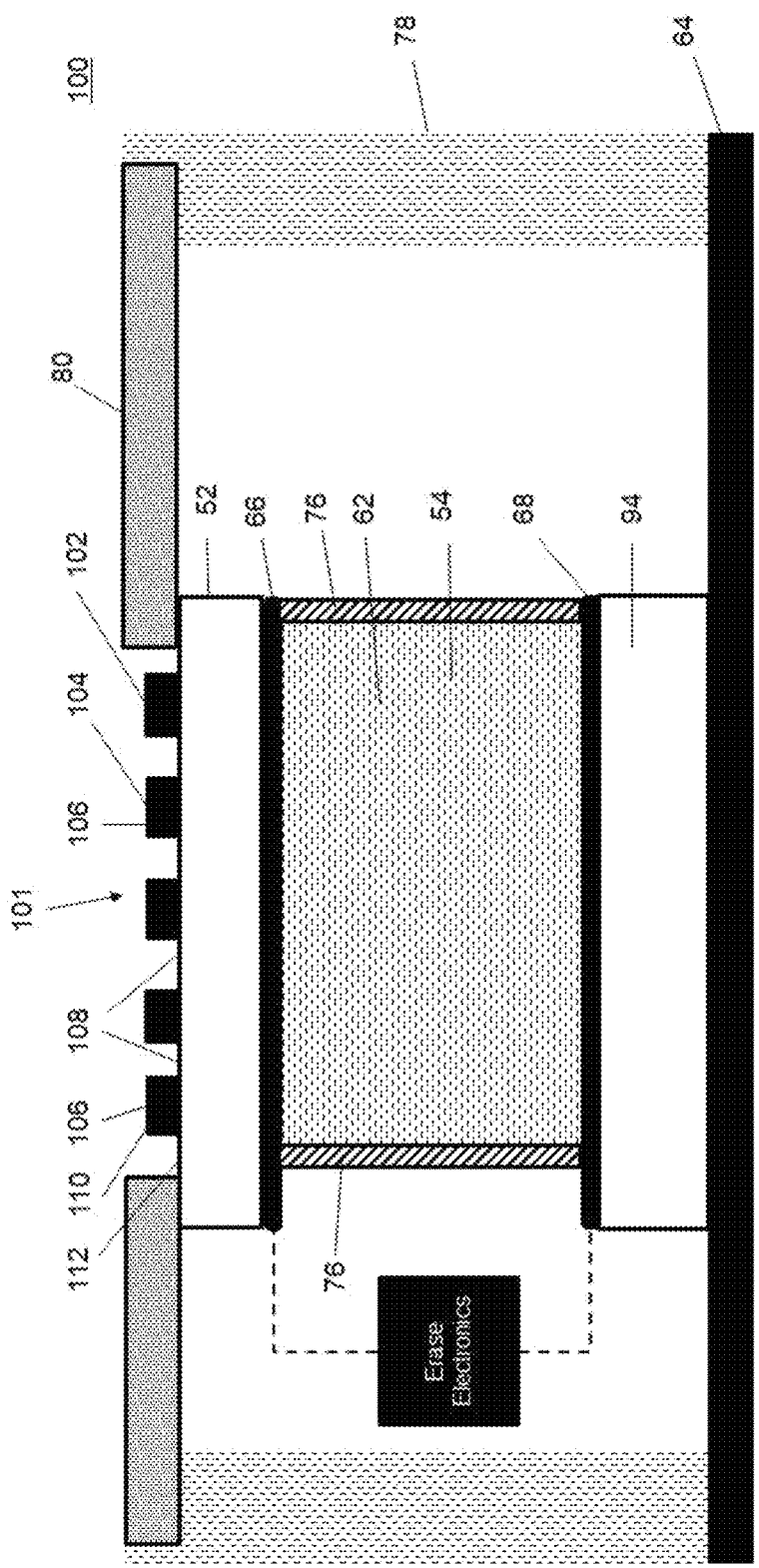
FIG. 6 is a side view of a sensory display of the disclosure in which at least one textured surface including a pattern of elements, is located in front of the liquid crystal layer.

The display of FIG. 6 is similar to that of FIG. 5 but sensory layer 101 includes at least one textured surface 102 including a pattern of elements 104. The elements 104 are circular or square or a random shape in a top view and protrude spaced apart from one another in a pattern (e.g., 1 mm diameter elements spaced 1 mm apart and raised 1 mil high with respect to an adjacent surface—the flexible front substrate 52). The sensory layer 101 could instead include an inverted textured surface like 60b or used in combination with an inverted textured surface like 60b. This differs from the display design of FIG. 3 in that the sensory layer 101 is in front of or near the flexible front substrate 52 rather than in back of the liquid crystal layer 54. The sensory layer 101 has at least one textured surface 102 that is constructed and arranged to provide at least one of vibratory, audible and tactile sensory feedback. The sensory layer 101 in conjunction with the rest of the display 100 also provides optical sensory feedback. By providing the at least one textured surface 102 in front of the liquid crystal layer 54, one is able to see the texture, feel the texture and/or hear sounds from the texture, when pressure by a moving marking instrument is applied on the flexible front substrate 52 over the at least one textured surface 102. The sensory layer 90 includes the elements 104 as peaks and regions around the elements as valleys formed of a material(s) that allows for flexing of the sensory layer 90. The marks that are made on the liquid crystal layer 54 are seen through the sensory layer 101 which is clear or semitransparent. The sensory layer 101 need not be covered by the liquid crystal layer 54 or any layer or substrate in this embodiment.

More specifically, there is a grid of a plurality of elements 104 formed of clear polymer, in this example, raised or protruding from the flexible front substrate 52. The outermost surface of the elements 104 that is raised forms a front surface portion 106 (i.e., peaks) of the cholesteric liquid crystal display and recessed areas of the front substrate around the elements 104 (or material of a front layer around the elements) form another front surface portion 108 (i.e., valleys) of the cholesteric liquid crystal display. Coatings or layers can be located on the outside of the front surface portions 106, 108 and/or between the front surface portions 106, 108 and the flexible front substrate 52. The elements 104 can be rigid or soft and in particular are rigid when protruding. The elements 104 can be laid out in any predetermined or arbitrary patterns, for example, triangles or stars laid out in a constellation. The elements 104 forming raised front surface portion 106 can be formed of a material 110 that is the same or different from material 112 around the elements 104 forming recessed front surface portions 108 (e.g., material that is softer or harder material than the elements); and materials 110 and 112 can have at least one of different texture, softness or hardness, mechanical properties besides softness and hardness, opacity, optical properties besides opacity, color and thicknesses, than each other. The materials 110, 112 could have the same softness or hardness but different thicknesses; they can be opaque or they can be semitransparent. Running a fingertip across the display provides sensory feedback, while running a stylus across the display can provide auditory and/or vibratory feedback.

Applying pressure on the front surface portion 106, 108 of the cholesteric liquid crystal display 100 on the elements 104 causes local deformation of the flexible front substrate 52, the liquid crystal layer 52, and the back substrate 94 if it is flexible. The back substrate 94 that is flexible can press against the optional back casing 64 in response to pressure. The optional front electrically conductive layer 66 locally deforms in response to the pressure and the optional back electrically conductive layer 68 and the optional light absorbing layer can, in some aspects, locally deform in response to the pressure, or not. The local deformation of the multiple layers of the display, in particular the liquid crystal layer, in response to the applied pressure changes the reflectance of the cholesteric liquid crystal material (e.g., to form an image). The pressure to the front substrate allows the front substrate to flex that causes the cholesteric liquid crystal material to flow. Applying pressure on the elements (front surface portions 106) leads to more concentrated regions of higher pressure and the liquid crystal layer underlying these portions is more noticeably marked than in the recessed regions (front surface portions 108) in between elements. The visual and sensory effect of the elements 104 that are spaced apart depends on the material of the elements and surrounding them, the sizes of the elements, the spacing of the elements and the size and material of the marking instrument.

Figure 7:
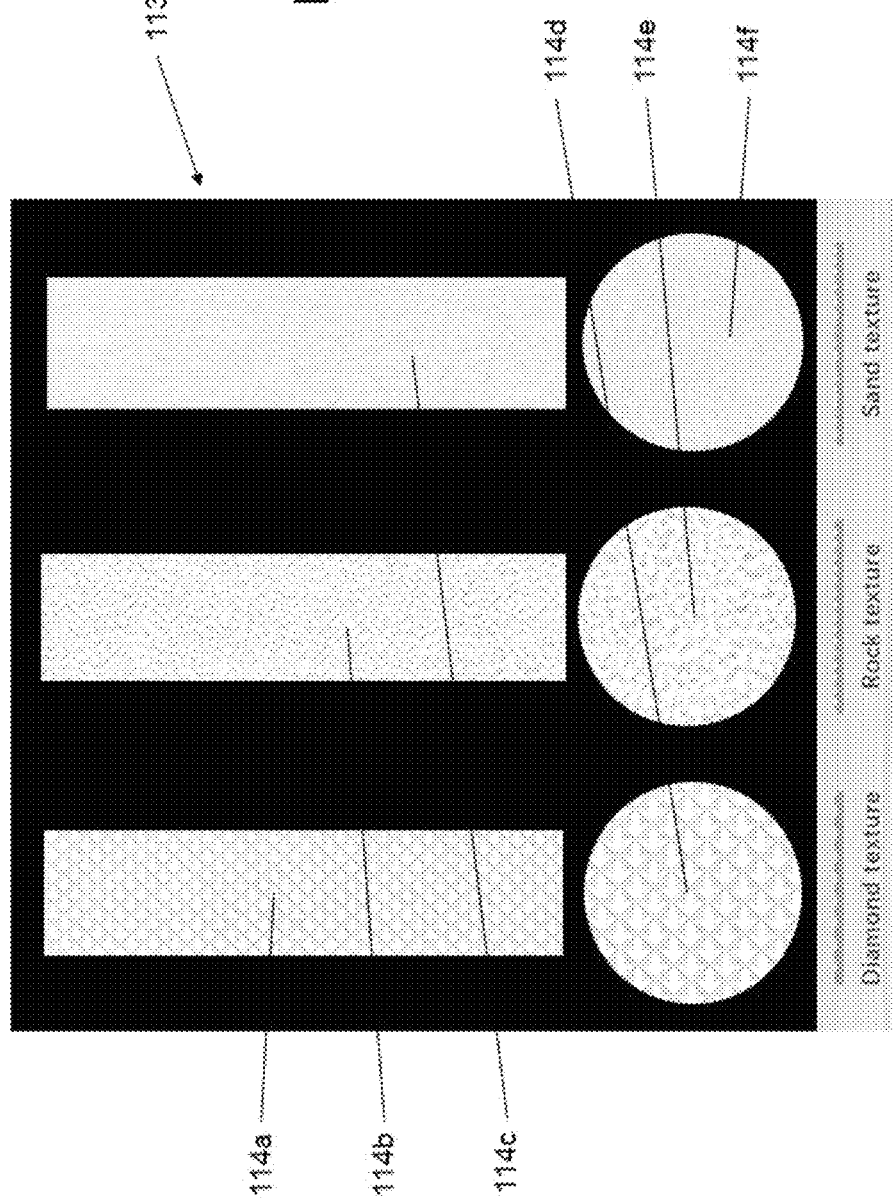
FIG. 7 shows calming strips used in a sensory layer of a sensory display of this disclosure.

FIG. 7 shows a sensory layer 113 formed by sensory calm strips having diamond, rock and sand textures, respectively, which are applied with adhesive to the smooth back casing 64 of a cholesteric liquid crystal display. The writing/marking panel of the cholesteric liquid crystal display would be fastened so as to overlay the structure shown in FIG. 7 that has been fastened to the back casing, for example. The sensory calm strips form the sensory layer. The sensory layer has six regions 114a, 114b, 114c, 114d, 114e and 114f including three different textured surfaces that are constructed and arranged to provide at least one of vibratory, audible and tactile sensory feedback, when used in or on the cholesteric liquid crystal display of this disclosure. The textured surfaces in conjunction with the rest of a sensory display may also provide optical feedback. Regions 114a and 114d, regions 114b and 114e and regions 114c and 114f, have the same textures as each other, respectively, but the regions of each pair are different shapes (rectangular or circular). The sensory layer 113 of FIG. 7 can alternatively be provided in front of the liquid crystal layer, in which case the user is able to feel and see the textured surfaces when marking the front substrate with a moving stylus, fingertip, fingernail, roller or stamp. Marks made on the liquid crystal layer may be seen through the sensory layer which can be clear or semitransparent. The sensory layer 113 can be seen in both the inactive state (unmarked) and active state (marked or in the process of being marked) of the cholesteric liquid crystal display.

Figure 8:
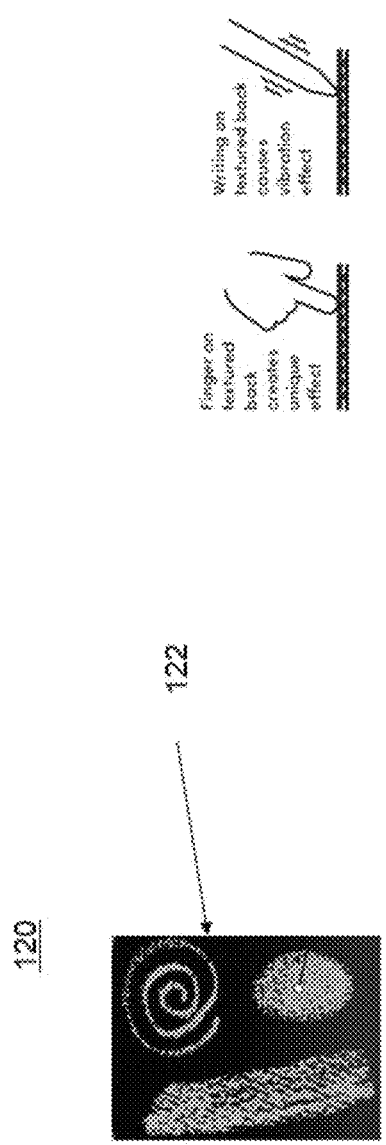
FIG. 8 shows a sensory display that is a toy product.

FIG. 8 shows a sensory display as a toy product 120 which includes cholesteric liquid crystal display 122 which could be any of the cholesteric liquid crystal displays of this disclosure, or variations thereof. In one example shown here, the cholesteric liquid crystal display 122 includes the textured surface in back of the liquid crystal layer. This cholesteric liquid crystal display sandwiches the liquid crystal layer between front and back electrically conductive layers and includes the erase electronics for providing the voltage waveform, which removes at least a portion of the changes in reflectance (e.g., erases at least a portion of the image). The sensory layer has at least one textured surface that is constructed and arranged to provide vibratory, audible and/or tactile sensory feedback, when used in the cholesteric liquid crystal display of this disclosure. The sensory layer in conjunction with the rest of the sensory display also provides optical feedback.

As shown in FIG. 8, when applying the pressure to the cholesteric liquid crystal display 122 with a fingertip, the user experiences optical feedback in the effect of the textured surface on the image. That is, the underlying texture or at least a portion of the texture, or the pattern to the texture or at least a portion of the pattern, is seen in the image. Tactile feedback can also be experienced by the user in feeling the texture with a fingertip, which can have a calming effect on the user. In addition, the user can apply the pressure using a stylus in this example, in which case, in addition to the optical feedback, there can be vibratory feedback. That is, the user feels vibrations that the stylus makes when passing over the at least one textured surface. Further, the user can receive auditory feedback in that when the stylus passes over the at least one textured surface it can produce sounds. These different feedbacks present an enjoyable new experience for the user of the toy product.

Referring now to more detailed features of the liquid crystal display devices of all embodiments of this disclosure, the flexible front substrate can include at least a portion that is transparent, semitransparent, opaque, or colored. Also, in all embodiments of this disclosure the back substrate, which can be flexible or not, the sensory layer and/or the back casing can be transparent, or can be semitransparent, opaque, or colored, and optionally can serve as a light absorbing background. In all embodiments of the disclosure the flexible front substrate and the back substrate can be formed of any suitable polymer material, for example, polyethylene terephthalate (PET), polycarbonate (PC), polyvinyl chloride (PVC), poly(ethylene-vinyl acetate) (PEVA), or acrylonitrile butadiene styrene (ABS).

The light absorbing layer can be coated or laminated on, or can be a part of, the back substrate, the sensory layer or the back casing. The light can also be absorbed by a light absorbing layer on the flexible front substrate or in the liquid crystal layer. In all of these cases, the light absorbing layer can be patterned or not. If the flexible back substrate, the sensory layer, and/or the back casing are light absorbing then a separate light absorbing layer may be omitted. The light absorbing layer can be omitted from the liquid crystal display device altogether, e.g., the display can be placed on any light absorbing surface, for example, on a wall, a desk or on clothing. Such a display could be completely transparent or include semitransparent components. The light absorbing layer may be flexible when used with a flexible back substrate and/or with a flexible sensory layer. When the light absorbing layer is patterned, it can be rigid or flexible.

The front and the back electrically conductive layers are formed of a suitably electrically conductive material, for example, conductive polymer (CP) or indium tin oxide. In all embodiments of the disclosure, the front and back electrically conductive layers are independently transparent, semitransparent or opaque and are, in particular, transparent. The front and back electrically conductive layers might or might not be the same as each other and they may be unpatterned or patterned. The distance between the front and back electrically conductive layers in the z direction of the liquid crystal display device, which extends perpendicular to the planes of the flexible front substrate and the back substrate, is referred to as the cell gap. The planes of the flexible front substrate and the back substrate, are referred to as x,y planes. If no electrically conductive layers are present, the distance between the flexible front substrate and the back substrate in the z direction of the liquid crystal display device, is referred to as the cell gap. Disposed in the liquid crystal layer within the cell gap are optional spacers having a size that approximates the cell gap (e.g., spherical spacers). The liquid crystal layer can include cholesteric liquid crystal material in which cholesteric liquid crystal is dispersed in a polymer matrix or the cholesteric liquid crystal material does not include cholesteric liquid crystal dispersed in a polymer matrix. The cell gap has a size, for example, in a range of about 2 microns to about 10 microns, in particular from about 2 microns to about 4 microns, most specifically about 2 microns in size. In one nonlimiting example, the front electrically conductive layer and the back electrically conductive layer can be adjacent to the liquid crystal layer and more specifically can be formed as two coatings, respectively, one on the inside of the flexible front substrate and one on the inside of the back substrate, respectively. The back substrate and the flexible front substrate, each having the respective electrically conductive layer, are extended to create a bottom ledge and a top ledge. The transparent front and back electrically conductive layers are/may be disposed on the ledges, respectively, for connecting to the erase electronics. The conductor on the bottom and top ledges does not have to be the same as the electrically conductive layers on the rest of the viewing area.

The optional front and back electrically conductive layers can be connected to erase circuitry adapted to apply an appropriate voltage pulse $V_2$ that refreshes the entire cholesteric liquid crystal display (i.e., erases the entire viewing surface) to the initial reflective texture or to the initial focal conic texture, creating a new full page upon which to mark again. The erase circuitry can be located in the back casing of the cholesteric liquid crystal display or in a capsule of the cholesteric liquid crystal display. In a variation, the erase circuitry does not have to be permanently attached to the cholesteric liquid crystal display. For example, the erase circuitry could be a separate unit from the cholesteric liquid crystal display which it periodically electrically engages when erasing is desired (see U.S. Pat. No. 9,651,813 which is incorporated by reference). The voltage profile needed to drive the cholesteric liquid crystal to the reflective or planar texture, in both cases where the erase circuitry is part of the cholesteric liquid crystal display or a separate unit from it, obeys the well-known electro-optical transition mechanisms of cholesteric liquid crystals (U.S. Pat. Nos. 5,437,811 and 5,453,863, which are incorporated herein by reference). A suitable voltage pulse or pulse sequence provided by erase circuitry to drive the cholesteric liquid crystal to the reflective or planar texture is sufficient to erase marks and refresh or initialize the cholesteric liquid crystal display. As in the embodiments described above, a constant voltage need not be applied to maintain the reflective texture or the transmissive texture.

In an embodiment, the liquid crystal layer is adapted so suitable mechanical flexing of the cholesteric liquid crystal display will initialize it to the reflective texture as well as erase a mark, enabling the cholesteric liquid crystal display to be reused (Flex Erase as disclosed in U.S. Pat. No. 11,656,519). In this regard, the cholesteric liquid crystal display can optionally include the front and back electrically conductive layers on either side of the liquid crystal layer, so that erasing may still occur electronically, as a variation of operation. The operation of flexing provides an alternative way of erasing the cholesteric liquid crystal display instead of applying voltage. When flexing the cholesteric liquid crystal display to erase it, the optional front and back electrically conductive layers are flexed along with the rest of the cholesteric liquid crystal display. When one wants to apply marks on the cholesteric liquid crystal display (after flex erasing or not) and to erase this by applying voltage, that is also possible. Different modes of flexing can be applied to the written-on cholesteric liquid crystal display to achieve full erasing of the image. Full erase to the reflective texture employs ripples of flexural stress traveling across the flexible cholesteric liquid crystal display. In one example embodiment, to enable use of flex to erase, the cholesteric liquid crystal display can have an optional back casing, a side casing or a front bezel, which are rigid, removed. See U.S. Pat. No. 11,656,519, directed to a display that is Flex Erased illustrating the flex erasing procedure, which is incorporated herein by reference in its entirety. For example, one can flex the cholesteric liquid crystal display by holding it with both hands and bending it (bend to erase). In another example, the cholesteric liquid crystal display may be flexed by shaking it until erasing is achieved (shake to erase). If the substrates are suitably thin, the cholesteric liquid crystal display can be rolled inwards and/or outwards flexing the entire viewing area permitting useful applications such as scrolls that erase the impact marks when rolled in and out (roll to erase). Flexing across the viewing area can also be achieved by peeling the flexible cholesteric liquid crystal display from an object that it contacts (peel to erase). There are many other examples of flexing of the substrates that can be used to achieve full erasing such as torsion and twisting, even crumpling.

The multilayer cholesteric liquid crystal display may be flexible, for example, when it is designed to be erased by flexing. Of course, this does not prevent the cholesteric liquid crystal display from including inflexible elements so long as they do not, for example, prevent erasing by flexing it. In one example, the back substrate could be a thicker element that enables less flexing of the multilayer cholesteric liquid crystal display but still enough to enable the flexing to erase it. Sides of the cholesteric liquid crystal display can be sealed in ways known to those having ordinary skill in the art including, but not limited to, sealing gaskets and laser singulation. For example, such sealing prevents delamination when the cholesteric liquid crystal display is flexed to erase it. In another example, the cholesteric liquid crystal display might include an inflexible frame or bezel but still enables flexing that erases it. On the other hand, the cholesteric liquid crystal display may be partially inflexible, such as when not being designed to employ flexing to erase it.

The seal can be located, for example, between the flexible front substrate and the back substrate that are coated with the front and back electrically conductive layers. The seal confines the sides of the liquid crystal layer inside the perimeter. The seal can comprise elastomeric material, adhesive material (e.g., cured adhesive) and/or welded material such as disclosed in U.S. Pat. No. 8,958,048, which is incorporated herein by reference in its entirety. A seal that is welded, such as may be implemented by a laser or heat, may be used in some applications; however, a seal of adhesive in particular is used since it not only completely surrounds the liquid crystal in one aspect, but also provides robust flexing of the marking tablet without damage. A seal that is welded may not completely surround the liquid crystal material since welding can easily destroy the ledges of exposed electrically conductive layers. The seal may comprise a weld of the flexible front substrate and the flexible back substrate, a bead of elastomeric material or a bead of adhesive material.

If the seal is comprised of an adhesive material it further allows for confining the liquid crystal at ledges where portions of the front electrically conductive layer and the back electrically conductive layer are disposed on the ledges, respectively. The ledges are used to enable application of voltage waveforms to the front and back electrically conductive layers to erase marks on the liquid crystal layer and to reinitialize the cholesteric liquid crystal display for future marking. In the case of a seal that is welded, the seal may not be present on or near the ledges to avoid electrically shorting the two electrically conductive layers together or destroying the electrical connection between the electrically conductive layer and a conductive lead that is on the ledge, by the laser or heat weld. An insulating layer may be added at the location of ledges to prevent shorting or a damaged electrical connection.

The disclosure now presents particular Examples, which should not be used in any way to unduly limit the subject matter as defined in the claims.

Example 1

A Boogie Board® Dashboard® cholesteric liquid crystal display was disassembled. The front casing was separated from the back casing to reveal clear tape holding down the cholesteric liquid crystal display to the back casing (rigid layer). This tape was removed to release the cholesteric liquid crystal display.

A 12 inch by 12 inch piece of 2 mil thick sheet of clear PET plastics was laminated to double sided Scotch pressure sensitive adhesive tape so that it covered the whole sheet. Using a hole punch, 1.5 mm diameter discs were cut from this sheet. The discs were then stuck on the back case on the side closest to the back substrate of the Boogie Board® Dashboard® cholesteric liquid crystal display in a 1.5 millimeter (mm) grid so that it covered the whole display area making a sensory layer.

Clear tape was reused to secure the display to the back casing. The front casing was reattached to the back casing using the screws. When a stylus, finger nail, or fingertip is used to mark the display (change reflectance in the liquid crystal layer upon applying pressure), one can see and feel the pattern form where the marking occurs. A sound also is formed as the marking occurs. When a stylus is used, one can feel vibrations as the stylus passes over the sensory layer. The marks can be erased using the attached erase electronics.

Example 2

A Boogie Board® Dashboard® cholesteric liquid crystal display was disassembled. The front casing was separated from the back casing to reveal clear tape holding down the cholesteric liquid crystal display to the back casing (rigid layer). This tape was removed to release the cholesteric liquid crystal display.

A piece of cardstock the size of the display area that is one half mm thick was punched with holes 1.5 mm in diameter spaced in a 1.5 mm random grid so that it covered the whole display area making a sensory layer. This cardstock was placed between the back case and the back substrate of the display.

Clear tape was reused to secure the cholesteric liquid crystal display to the back casing. The front casing was reattached to the back casing using the screws. When a stylus, finger nail, or fingertip is used to mark the cholesteric liquid crystal display (change reflectance in the liquid crystal layer upon applying pressure), one can see and feel the pattern form where the marking occurs. A sound also is formed as the marking occurs. When a stylus is used, one can feel vibrations as the stylus passes over the sensory layer. The marks can be erased using the attached erase electronics.

Example 3—Sensory Stickers on Back

A Boogie Board® SketchPals® cholesteric liquid crystal display was disassembled. The front casing was separated from the back casing to reveal clear tape holding down the display to the back casing (rigid layer). This tape was removed to release the cholesteric liquid crystal display.

Sensory calm strips were purchased from Amazon.com, the diamond, rock, and sand texture were chosen from the pack. These three strips were adhered to the back case on the side closest to the back substrate in a vertical pattern so as to cover the whole display area in the form of exclamation points (FIG. 7). The result is 6 sensory regions with 3 different textures than each other forming a sensory layer.

Clear tape was reused to secure the cholesteric liquid crystal display to the textured back casing. The front casing was reattached to the back casing using the screws. When a stylus, finger nail, or fingertip is used to mark the cholesteric liquid crystal display (change reflectance in the liquid crystal layer upon applying pressure), one can see and feel the 3 textures form where the marks occur. A different sound is heard in each of the 3 strips of the sensory regions when marking occurs, compared to when making a mark by applying pressure over the other sensory regions. When a stylus is used, one can feel vibrations as the stylus passes over the sensory layer. The marks can be erased using the attached erase electronics.

Example 4—Clear Sensory Stickers on Front

Transparent Sensory calm strips were purchased from Amazon.com; the diamond, rock, and sand textures were chosen from the pack. These three strips were adhered to the front surface of the Boogie Board® SketchPals® cholesteric liquid crystal display. The result is 3 vertical sensory strips, totaling 6 regions, with 3 different textures than each other forming a sensory layer.

When a stylus, finger nail, or fingertip is used to mark the cholesteric liquid crystal display (change in reflectance in the liquid crystal layer upon applying pressure to the cholesteric liquid crystal display), one can see and feel the 3 different textures. A different sound is heard in the 3 sensory regions when marking occurs. When a stylus is used, one can feel vibrations as the stylus passes over the sensory layer. The marking can be erased using the attached erase electronics.

Many modifications and variations will be apparent to those of ordinary skill in the art in light of the foregoing disclosure. Therefore, it is to be understood that, within the scope of the appended claims, the invention can be practiced otherwise than has been specifically shown and described.

What is claimed is:

1. A cholesteric liquid crystal display providing sensory feedback, comprising:
    a flexible front substrate that is at least partially flexible;
    a liquid crystal layer comprising cholesteric liquid crystal material;
    wherein pressure applied to said flexible front substrate changes reflectance of said cholesteric liquid crystal material;
    at least one textured surface that is constructed and arranged so that pressure that is applied to said at least one textured surface provides at least one of vibratory, audible and tactile sensory feedback;
    wherein at least a portion of said changes in reflectance is erased.

2. The cholesteric liquid crystal display of claim 1 comprising providing at least one of a moving stylus, fingertip, fingernail, roller and stamp by which said pressure is applied.

3. The cholesteric liquid crystal display of claim 1 comprising electrically conductive layers between which said liquid crystal layer is disposed and erase electronics that applies a voltage waveform.

4. The cholesteric liquid crystal display of claim 3 comprising a back substrate in back of said liquid crystal layer, wherein said electrically conductive layers and said liquid crystal layer are disposed between said flexible front substrate and said back substrate.

5. The cholesteric liquid crystal display of claim 1 comprising a back substrate in back of said liquid crystal layer.

6. The cholesteric liquid crystal display of claim 5 wherein said back substrate is semitransparent or opaque.

7. The cholesteric liquid crystal display of claim 1 wherein flexing of said cholesteric liquid crystal display erases at least a portion of said changes in reflectance.

8. The cholesteric liquid crystal display of claim 1 wherein said at least one textured surface comprises a plurality of elements that are: spaced apart from each other, at least one of protruding and recessed from an adjacent surface and are located near said front substrate of the cholesteric liquid crystal display.

9. The cholesteric liquid crystal display of claim 8 comprising a layer adapted to provide at least one of a gel sensation and a spongy sensation.

10. The cholesteric liquid crystal display of claim 8 wherein said plurality of elements are comprised of transparent polymer and are inflexible.

11. The cholesteric liquid crystal display of claim 1 wherein said at least one textured surface comprises a plurality of elements that are: spaced apart from each other, at least one of protruding and recessed from an adjacent surface and are located near a back surface of the cholesteric liquid crystal display below said liquid crystal layer.

12. The cholesteric liquid crystal display of claim 11 comprising a layer adapted to provide at least one of a gel sensation and a spongy sensation.

13. The cholesteric liquid crystal display of claim 11 wherein said plurality of elements are comprised of polymer and are inflexible.

14. The cholesteric liquid crystal display of claim 11 wherein said plurality of elements are formed as a plurality of openings in a layer of polymer or cardboard.

15. The cholesteric liquid crystal display of claim 11 wherein said plurality of elements are raised on a layer of polymer or cardboard.

16. The cholesteric liquid crystal display of claim 1 wherein said at least one textured surface has a texture that is selected from at least one of diamond, rock and sand.

17. The cholesteric liquid crystal display of claim 1 wherein the pressure that is applied to said at least one textured surface provides optical sensory feedback, whereby said pressure applied to said at least one textured surface in conjunction with the rest of the cholesteric liquid crystal display contributes to the change in reflectance.

18. The cholesteric liquid crystal display of claim 1 wherein said pressure that is applied to said at least one textured surface with a moving marking instrument provides said tactile sensory feedback, whereby when the moving marking instrument moves over said at least one textured surface this is felt by the user.

19. The cholesteric liquid crystal display of claim 1 wherein the pressure that is applied to said at least one textured surface by a moving marking instrument provides said vibratory sensory feedback, whereby when the moving marking instrument moves over the at least one textured surface vibrations are felt by the user.

20. The cholesteric liquid crystal display of claim 1 wherein the pressure that is applied to said at least one textured surface by a moving marking instrument provides said audible sensory feedback, whereby the moving marking instrument makes a sound when traveling over said at least one textured surface.

21. The cholesteric liquid crystal display of claim 1 wherein said at least one textured surface comprises strips or regions formed by at least two or more of said textured surfaces having different textures than each other.

22. The cholesteric liquid crystal display of claim 1 wherein a texture of said at least one textured surface is adapted to calm the user of the cholesteric liquid crystal display when touching with the fingertip of the user.

23. A toy comprising the cholesteric liquid crystal display of claim 1.

\* \* \* \* \*